(12) United States Patent
Lee

(10) Patent No.: US 12,154,463 B2
(45) Date of Patent: Nov. 26, 2024

(54) DISPLAY MODULE AND DISPLAY APPARATUS INCLUDING THE SAME HAVING A BASE WITH A COUPLING PORTION

(71) Applicant: LG Display Co., Ltd., Seoul (KR)

(72) Inventor: Daljae Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 212 days.

(21) Appl. No.: 17/879,366

(22) Filed: Aug. 2, 2022

(65) Prior Publication Data
US 2023/0036277 A1 Feb. 2, 2023

(30) Foreign Application Priority Data

Aug. 2, 2021 (KR) .......................... 10-2021-0101216

(51) Int. Cl.
*G09F 9/30* (2006.01)
*F16M 11/04* (2006.01)
*F16M 11/16* (2006.01)
*F16M 13/00* (2006.01)

(52) U.S. Cl.
CPC ........... *G09F 9/301* (2013.01); *F16M 11/046* (2013.01); *F16M 11/16* (2013.01); *F16M 13/005* (2013.01)

(58) Field of Classification Search
CPC ..... G06F 1/1652; G06F 1/1637; G06F 1/1624
See application file for complete search history.

(56) References Cited

U.S. PATENT DOCUMENTS

| | | | |
|---|---|---|---|
| 2019/0204874 A1* | 7/2019 | Kim | G06F 1/1643 |
| 2020/0365063 A1* | 11/2020 | Park | H10K 50/84 |
| 2021/0272486 A1* | 9/2021 | Khachatryan | G09F 9/301 |

FOREIGN PATENT DOCUMENTS

| | | |
|---|---|---|
| KR | 10-2018-0056444 A | 5/2018 |
| KR | 10-2021-0012390 A | 2/2021 |

* cited by examiner

*Primary Examiner* — James Wu
*Assistant Examiner* — Dakota M Talbert
(74) *Attorney, Agent, or Firm* — Seed IP Law Group LLP

(57) ABSTRACT

A display apparatus includes a display with at least a portion of the display being deformable and an apron with at least a portion of the apron being deformable. The apron is coupled to the display, a printed circuit board is electrically connected to the display, and a bracket having the printed circuit board mounted thereon is coupled to the apron to press the display disposed between the apron and the bracket, thereby providing a structure that is more stable to a phenomenon in which a display apparatus of a roll-up structure is peeled off.

13 Claims, 13 Drawing Sheets

DISPLAY MODULE AND DISPLAY APPARATUS INCLUDING THE SAME HAVING A BASE WITH A COUPLING PORTION

CROSS-REFERENCE TO RELATED APPLICATION

This application claims priority to and the benefit of Korean Patent Application No. 10-2021-0101216, filed on Aug. 2, 2021, which is hereby incorporated by reference as if fully set forth herein.

BACKGROUND

Technical Field

The present disclosure relates to a display module and a display apparatus including the same, and more particularly, to a display module having a structure with improved durability and a display apparatus including the same.

Description of Related Art

Contents described in this Background section simply provide background information about the present disclosure and do not constitute the prior art.

As we enter a full-fledged information era, a display apparatus that visually expresses an electrical information signal has developed rapidly. In response thereto, various display apparatus having excellent performance, thinness, light weight, and low power consumption have been developed.

The display apparatus include a liquid crystal display apparatus (LCD), a quantum dot (QD) display apparatus, a field emission display apparatus (FED), an electro-wetting display apparatus (EWD), and an organic light-emitting display apparatus (OLED), etc.

The display apparatus is miniaturized so that the apparatus may be carried by a user. The display apparatus has been developed to be mounted on a movable apparatus such as a vehicle. Thus, the user may use the display apparatus on the vehicle more conveniently.

BRIEF SUMMARY

For convenience of a user, development of a display apparatus having a roll-up structure is active. Such roll-up display apparatus and a display module included therein may have a roll-up display of a flexible structure that is bent.

In one example, the display may be formed in a structure having a plurality of layers in which components having different functions are stacked on each other. The bending may occur continuously and repeatedly by use of the roll-up display. Due to such bending, adhesion between the layers of the display having the stack structure is degraded, so that a peeling phenomenon in which the layers are separated from each other may occur.

In particular, a cover glass disposed in the display has a predefined thickness and has a relatively great elastic force. Therefore, in the case of bending, adhesion with other layers may be more easily degraded by repulsion due to such elastic force, so that the cover glass may be easily peeled.

In particular, the peeling phenomenon is relatively highly likely to occur at a lower end of the display where bonding between the layers forming the display ends. The peeling that occurred at the lower end of the display may gradually spread to a center of the display due to the continuous use of the display apparatus.

Such peeling phenomenon may cause a malfunction or a failure of the display. A solution to such problem is required.

Further, an apron that supports the display in the display apparatus and guides an operation may be attached to the display. Due to the continuous and repetitive bending of the display, adhesion between the display and the apron at the lower end of the display may be degraded, which may cause a separation between the display and the apron. Thus, the malfunction or the failure of the display may occur. A solution to such problem is required.

Accordingly, a purpose of the present disclosure is to provide a display module having a structure capable of suppressing an occurrence of a peeling phenomenon in a display that contains a flexible material and has a structure of being bendable.

In addition, a purpose of the present disclosure is to provide a display module having a structure that suppresses an occurrence of a peeling phenomenon at a lower end of a display and a display apparatus including the same.

In addition, a purpose of the present disclosure is to provide a display module having a structure that may suppress separation resulted from degradation of adhesion between a display and an apron at a lower end of the display and a display apparatus including the same.

In addition, a purpose of the present disclosure is to provide a display module having a structure capable of stably mounting a printed circuit board having a driving circuit and a display apparatus including the same.

Purposes of the present disclosure are not limited to the above-mentioned purpose. Other purposes and advantages of the present disclosure that are not mentioned may be understood based on following descriptions, and may be more clearly understood based on embodiments of the present disclosure. Further, it will be easily understood that the purposes and advantages of the present disclosure may be realized using means shown in the claims and combinations thereof.

A display module according to an embodiment may include a display and an apron. The display and the apron may be constructed to be coupled to each other, and the display may be made of a flexible material such that at least a portion thereof is deformable.

The apron may have a structure in which at least portion thereof is deformable such that at least the portion thereof may move integrally with the display.

The display may be formed in a plate shape, and may include a cover glass and a panel attached to one face of the cover glass and reproducing an image or a video.

The printed circuit board may include a first board and a second board. However, the printed circuit board may include at least three boards. The first board may be electrically connected to the display. The first board may have various active elements, passive elements, and printed circuits constituting the driving circuit.

The second board may be electrically connected to the first board and disposed at a position spaced apart from the first board. For example, the second board may be connected to an external power source to supply electricity to the first board and the display.

The second connector may electrically connect the first board and the second board to each other and may be constructed to be bendable. The first connector and the second connector may include a plurality of first connectors and a plurality of second connectors, respectively.

The display module according to an embodiment may further include the bracket. The bracket may be coupled to the lower end of the display and the printed circuit board may be mounted on the bracket.

The bracket may be coupled to the display and press the display to maintain close contact between the display and the apron, thereby effectively suppressing the separation between the apron and the display.

The bracket may be coupled to a bottom face of the display, and may dispose the printed circuit board on the bottom face of the display in a way with respect to the display. The bracket may allow the first board and the second board to maintain a distance from each other in the first direction.

The bracket may include a base and a pressing coupling portion. The base may be disposed on bottom faces of the display and the apron and directed in a direction intersecting the first direction of the display and the apron, and the printed circuit board may be mounted on the base.

The pressing coupling portion may be bent from a front face of the base in a way directed parallel to the first direction of the display, and may be coupled to the apron and may be in contact with the display to press the display.

The apron may include a plurality of first protrusions protruding from the lower end of the display. The first protrusion may include a plurality of first protrusions, and the first protrusions may be disposed to be spaced apart from each other along a length direction of the pressing coupling portion of the bracket.

The pressing coupling portion may be coupled to the first protrusion to press the display. The pressing coupling portion and the first protrusion may be coupled to each other by a fastening mechanism such as a screw bolt.

The first protrusion may have a first fastening hole formed therein into which the coupling mechanism is fastened. The pressing coupling portion may have a second fastening hole formed therein into which the coupling mechanism is fastened at a position corresponding to the first fastening hole.

The base may include a seating plate and a second protrusion. The seating plate may be bent from the pressing coupling portion and the first board may be seated on a top face of the seating plate. The second protrusion may protrude downwardly of the seating plate, and may separate the first board and the second board from each other in the first direction.

The first board may be seated on the top face of the seating plate, and the second board may be seated on a bottom face of the first protrusion. In this regard, the first board and the second board may be coupled to the bracket by the coupling mechanism such as the screw bolt, and may be disposed to be spaced apart from each other in the first direction of the display module.

The second protrusion according to an embodiment may be formed as a top face of the seating plate is recessed and a bottom face of the seating plate protrudes. The second protrusion according to another embodiment may be formed as a protrusion is formed on a bottom face of the seating plate.

The apron may have a recessed groove formed therein such that a length direction thereof is directed in a lateral direction of the display. A wall face of the recessed groove according to one embodiment may be in a straight shape. A wall face of the recessed groove according to another embodiment may be in a curved shape.

One embodiment of the display apparatus may include the display constructed such that at least a portion thereof is deformable, the apron constructed such that at least a portion thereof is deformable, wherein the apron is coupled to the display, the printed circuit board electrically connected to the display, and the bracket having the printed circuit board mounted thereon, wherein the bracket is coupled to the apron to press the display disposed between the apron and the bracket.

The display apparatus according to an embodiment may include a display module, a housing, a rolling guide, a guide, and a motor. The display module is the same as described above. The housing may accommodate therein at least a portion of the display module.

The rolling guide may be accommodated in the housing and may rotate with respect to the housing. The rolling guide may be disposed such that the display module is mounted thereon and at least the portion of each of the display and the apron is wound therearound.

The guide may have one end mounted on the apron and the other end mounted on the housing. The guide may change an externally exposed area of each of the display and the apron by moving each of the display and the apron in the first direction.

The rolling guide may include a curved portion, a bridge, and a rib. The display and the apron may be wound around an outer circumferential face of the curved portion. The curved portion may be formed in, for example, a circular arc shape.

The bridge may connect both ends of the curved portion to each other. The curved portion and the bridge may be integrally formed, but the present disclosure may not be limited thereto.

The rib may be coupled to the bridge, the printed circuit board and the bracket may be mounted on the rib, and the rib may be coupled to a lower portion of the apron. The rib may be approximately formed in a plate shape.

In the display module and the display apparatus including the same according to the present disclosure, the bracket may be coupled to the display and press the display to maintain close contact between the display and the apron, thereby effectively suppressing the separation between the apron and the display.

Further, the bracket may be coupled to the apron and disposed to surround the lower end of the display, so that the lower end of the display may be pressed by the bracket from the front and pressed by the apron from the rear.

The lower end of the display may be pressed by the bracket and the apron, so that, even when the display is repeatedly bent, the layers constituting the display may maintain close contact therebetween. Accordingly, the occurrence of peeling at the lower end of the display may be effectively suppressed.

Further, in the display module and the display apparatus including the same according to the present disclosure, the bracket may secure a space for preventing the first board and the second board from being in contact with each other or interfering with each other and for the elements disposed on each board to be mounted. Accordingly, the bracket may stably mount the printed circuit board including the driving circuit to the display module.

Effects of the present disclosure are not limited to the above-mentioned effects, and other effects as not mentioned will be clearly understood by those skilled in the art from following descriptions.

The purposes, solutions, and effects of the disclosure as described above does not specify essential features of claims. Thus, the scope of claims is not limited by the purposes, solutions, and effects of the disclosure as described above.

DETAILED DESCRIPTION

Figure 1:
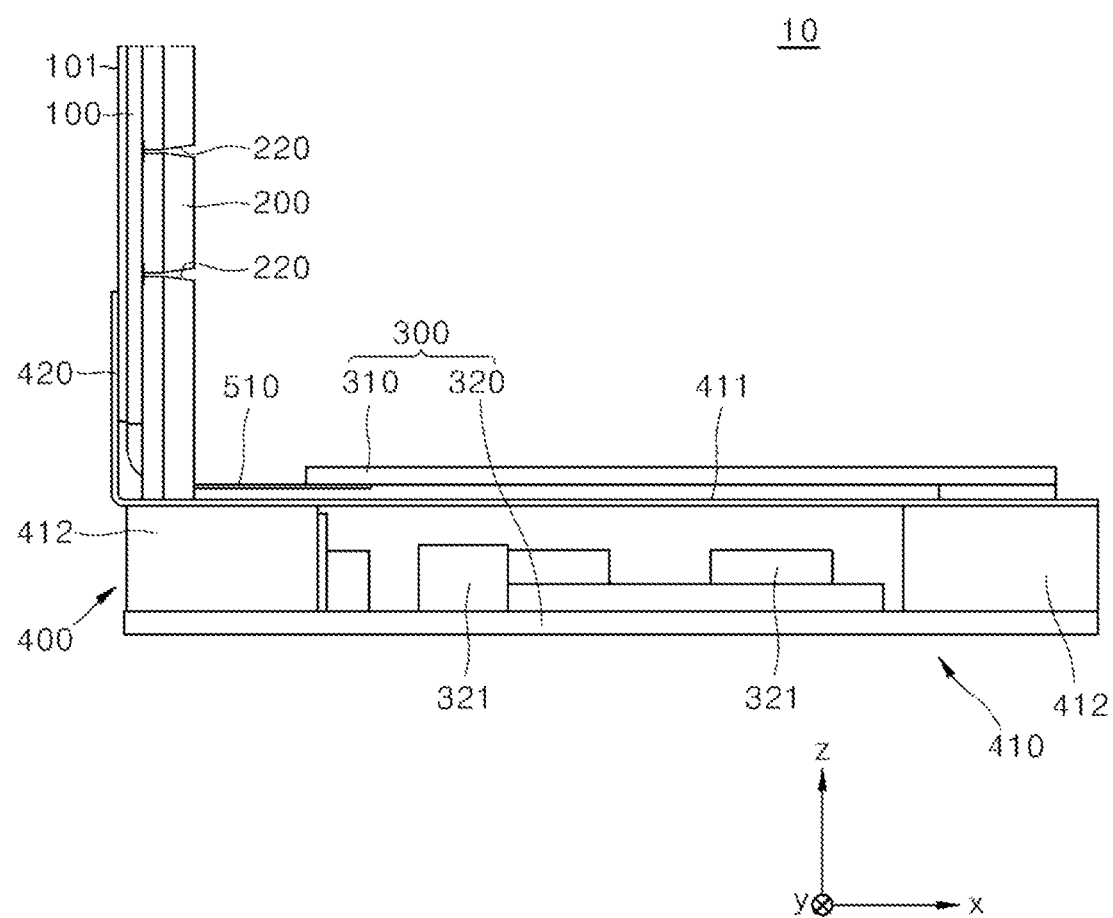
FIG. 1 is a side view showing a display module according to one embodiment.

Advantages and features of the present disclosure, and how to achieve them will become apparent with reference to the embodiments described below in detail in conjunction with the accompanying drawings. However, the present disclosure is not limited to the embodiments as disclosed below, but will be implemented in a variety of different forms. Only these embodiments make the present disclosure complete, and are constructed to fully inform those having common knowledge in the technical field to which the present disclosure belongs of a scope of the disclosure. A shape, a size, a ratio, an angle, a number, etc., disclosed in the drawings for illustrating embodiments of the present disclosure are exemplary, and the present disclosure is not limited thereto. The same reference numerals refer to the same elements herein. Further, in describing the present disclosure, when it is determined that a detailed description of a related known element may unnecessarily obscure gist of the present disclosure, the detailed description thereof will be omitted. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

In interpreting a numerical value, the value is interpreted as including an error range unless there is no separate explicit description thereof.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present. In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events such as "after", "subsequent to", "before", etc., another event may occur therebetween unless "directly after", "directly subsequent" or "directly before" is not indicated.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The features of the various embodiments of the present disclosure may be partially or entirely combined with each other, and may be technically associated with each other or operate with each other. The embodiments may be implemented independently of each other and may be implemented together in an association relationship.

In descriptions of temporal relationships, for example, temporal precedent relationships between two events such as "after", "subsequent to", "before", etc., another event may occur therebetween unless "directly after", "directly subsequent" or "directly before" is not indicated. The features of the various embodiments of the present disclosure may be partially or entirely combined with each other, and may be technically associated with each other or operate with each other. The embodiments may be implemented independently of each other and may be implemented together in an association relationship. Spatially relative terms, such as "beneath," "below," "lower," "under," "above," "upper," and the like, may be used herein for ease of explanation to describe one element or feature's relationship to another element or feature as illustrated in the figures. It will be understood that the spatially relative terms are intended to encompass different orientations of the apparatus in use or in operation, in addition to the orientation depicted in the figures. For example, when the apparatus in the drawings may be turned over, elements described as "below" or "beneath" or "under" other elements or features would then be oriented "above" the other elements or features. Thus, the example terms "below" and "under" may encompass both an orientation of above and below. The apparatus may be otherwise oriented for example, rotated 90 degrees or at other orientations, and the spatially relative descriptors used herein should be interpreted accordingly.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, a first direction refers to a vertical direction of a display apparatus in a state in which the display apparatus is installed for daily use. A second direction means a direction orthogonal to the first direction, and the third direction means a direction perpendicular to both the first direction and the second direction. Further, as used herein, a phrase "move in the first direction" and a phrase "move up or down" may have the same meaning.

A Cartesian coordinate system may be used in drawings. In the Cartesian coordinate system, a z-axis direction represents the first direction, a y-axis direction represents the second direction, and an x-axis direction represents the third direction.

A display apparatus including a display module 10 according to an embodiment may be mounted on a mobile apparatus such as a vehicle to provide convenience to a user. Hereinafter, a display apparatus mounted on a dashboard of the vehicle will be described by way of example.

The display apparatus according to an embodiment may include, for example, a liquid crystal display apparatus (LCD), a quantum dot (QD) display apparatus, a field emission display apparatus (FED), an electrowetting display apparatus (EWD), and an organic light-emitting display apparatus (OLED), etc. However, the present disclosure is not limited thereto.

FIG. 1 is a side view showing the display module 10 according to one embodiment. The display apparatus module 10 according to an embodiment may include a display 100 and an apron 200. The display 100 and the apron 200 are constructed to be coupled to each other. The display 100 may be made of a flexible material to be at least partially deformable.

The apron 200 may have a structure in which at least a portion thereof is deformable so that at least a portion thereof may move integrally with the display 100. Each of the display 100 and the apron 200 may be constructed such that at least a portion thereof slides in the first direction. That is, each of the display portion 100 and the apron 200 may be constructed such that at least a portion thereof ascends and descends with respect to the display apparatus.

The display apparatus may include a housing 20 to accommodate therein at least a portion of the display 100 and at least a portion of the apron 200. When the display 100 and the apron 200 move downward, at least a portion of each of the display 100 and the apron 200 may be bent and deformed to a curved shape when viewed from a side and thus may be accommodated in the housing 20.

In this regard, each of the display 100 and the apron 200 may be constructed such that at least a portion thereof is wound around a rolling guide 30 disposed in the display apparatus. Accordingly, the display 100 and the apron 200 may be continuously and repeatedly deformable.

In one example, a protective film 101 for protecting the display 100 may be attached to a front face of the display 100. For example, the protective film 101 may be formed as a scattering preventing film that prevents the display 100 from being broken into pieces and scattering by an external impact to protect a user.

The display 100 may be formed in a plate shape, and may include a cover glass and a panel attached to one face of the cover glass and reproducing an image or a video.

In addition, the display 100 may be formed in a structure in which a polarizer, a back plate irradiating light to the panel, and various adhesives for bonding the above-described components to each other are stacked.

Because the display 100 of an embodiment has a structure wound around the rolling guide 30, that is, a rolling structure, bending may occur continuously and repeatedly. Due to such bending, adhesion between layers of the display 100 having the stacked structure is degraded, so that a peeling phenomenon in which the layers are separated from each other may occur.

In particular, because the cover glass has a predefined thickness and has a relatively great elastic force, when being bent, the cover glass may be easily peeled as adhesion with other layers is more easily degraded by repulsion resulted from such elastic force.

Such peeling phenomenon may cause a malfunction or a failure of the display 100. Further, it may be difficult for the display 100 to be accommodated in the housing 20 while sliding due to such peeling phenomenon.

In addition, when the peeling phenomenon occurs, friction resulted from interference between the housing 20 and the display 100 occurs, thereby further shortening a lifespan of the display module 10 and the display apparatus including the same.

In particular, there is a relatively high possibility that the peeling phenomenon occurs at a lower end of the display 100 where the bonding between the layers forming the display 100 ends. Because the bending does not occur at an upper end of the display 100 in the display module 10 according to an embodiment, the possibility of peeling is relatively lower than that of the lower end of the display 100.

The peeling that occurred at the lower end of the display 100 may gradually spread to a center of the display 100 due to continuous use of the display apparatus.

Accordingly, an embodiment provides the display module 10 having a structure that suppresses the occurrence of the peeling at the lower end of the display 100 and a display apparatus including the same.

Figure 2:
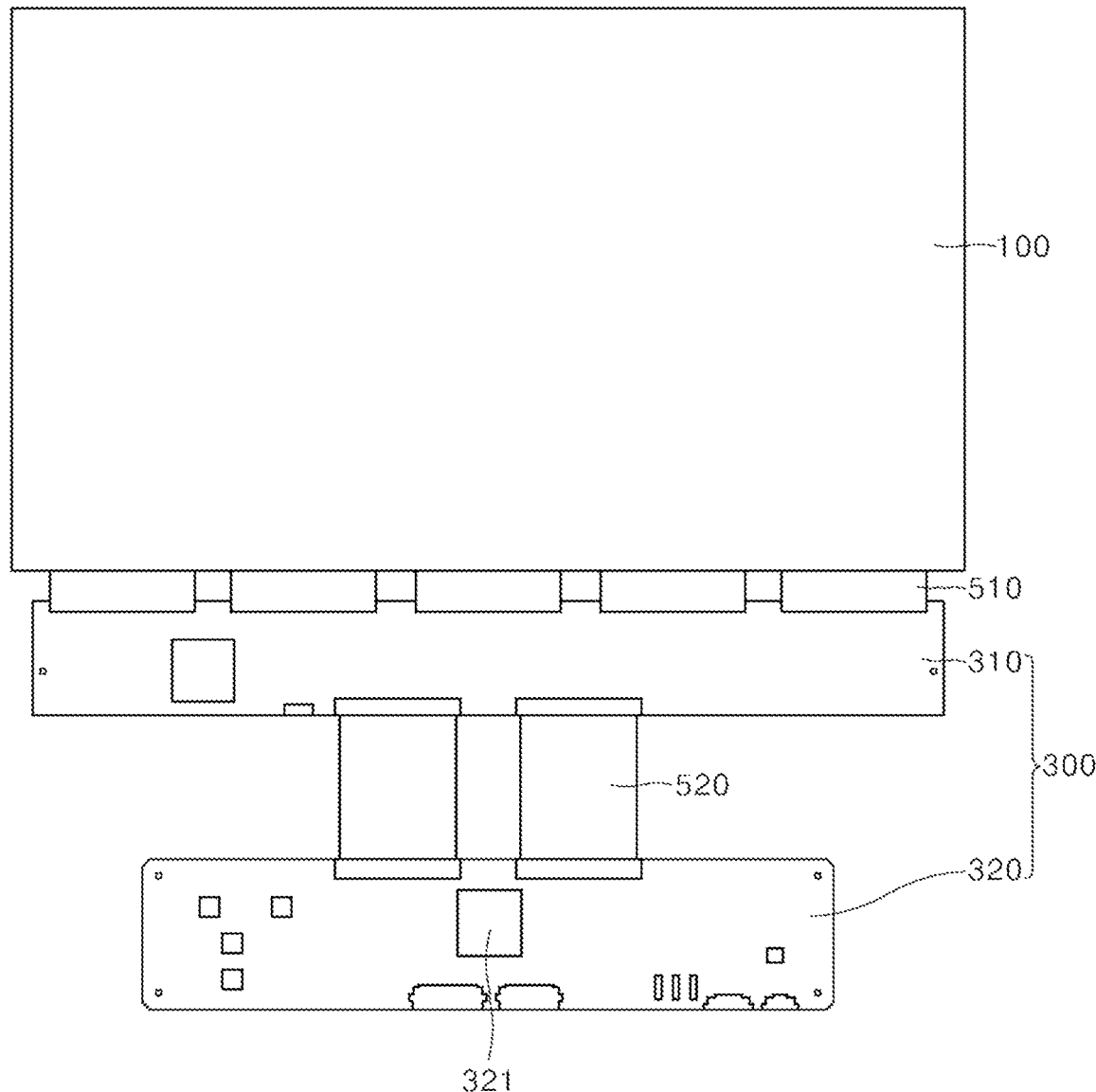
FIG. 2 is a development view showing a coupled structure of a display and a printed circuit board in a display module according to one embodiment.

FIG. 2 is a development view showing a coupled structure of the display 100 and the printed circuit board 300 in the display module 10 according to one embodiment. The structure shown in FIG. 2 is the development view, and boards and connectors for connecting the boards may be mounted on a bracket 400 to be described later in a partially folded state.

The display module 10 may further include a printed circuit board 300 having a driving circuit for controlling an operation of the display 100. The printed circuit board 300 may be electrically connected to the display 100, and may include a plurality of boards and connectors for connecting the plurality of boards to each other. In this regard, the driving circuit may be distributed on all or some of the boards and the connectors.

The printed circuit board 300 may include a first board 310 and a second board 320. However, the printed circuit board 300 may include at least three boards.

The first board 310 may be electrically connected to the display 100. The first board 310 may have various active elements, passive elements, and printed circuits constituting the driving circuit.

The first board 310 may have elements of relatively small sizes that mainly serve to transmit and receive signals related to the image or the video reproduced on the display 100. Accordingly, the first board 310 may have elements of relatively small volumes compared to the second board 320.

The second board 320 may be electrically connected to the first board 310 and disposed at a position spaced apart from the first board 310. Like the first board 310, the second board 320 may have various active elements, passive element, and printed circuits constituting the driving circuit.

For example, the second board 320 may be connected to an external power source to supply electricity to the first board 310 and the display 100. To this end, a circuit element 321 disposed on the second board 320 may have a relatively great volume for rectification conversion of voltage, and the like of the electricity supplied from external power source.

Therefore, the display module 10 needs to maintain a predefined separation distance between the first board 310 and the second board 320 such that the circuit element 321 disposed on the second board 320 is stably disposed without being in contact with the first board 310. In the display module 10, maintaining of the separation distance between the first board 310 and the second board 320 may be performed by a bracket 400 to be described later.

The printed circuit board 300 may further include a first connector 510 and a second connector 520. The first connector 510 may electrically connect the display 100 and the first board 310 to each other and may be constructed to be bendable.

The second connector 520 may electrically connect the first board 310 and the second board 320 to each other and may be constructed to be bendable. The first connector 510 and the second connector 520 may include a plurality of first connectors and a plurality of second connectors, respectively.

A portion of the driving circuit may be disposed on each of the first connector 510 and the second connector 520, and each of the first connector 510 and the second connector 520 may be made of a flexible material that is easy to be bent so as to be folded and unfolded well. The first connector 510 and the second connector 520 may be maintained in a bent form when mounted on the bracket 400.

Figure 3:
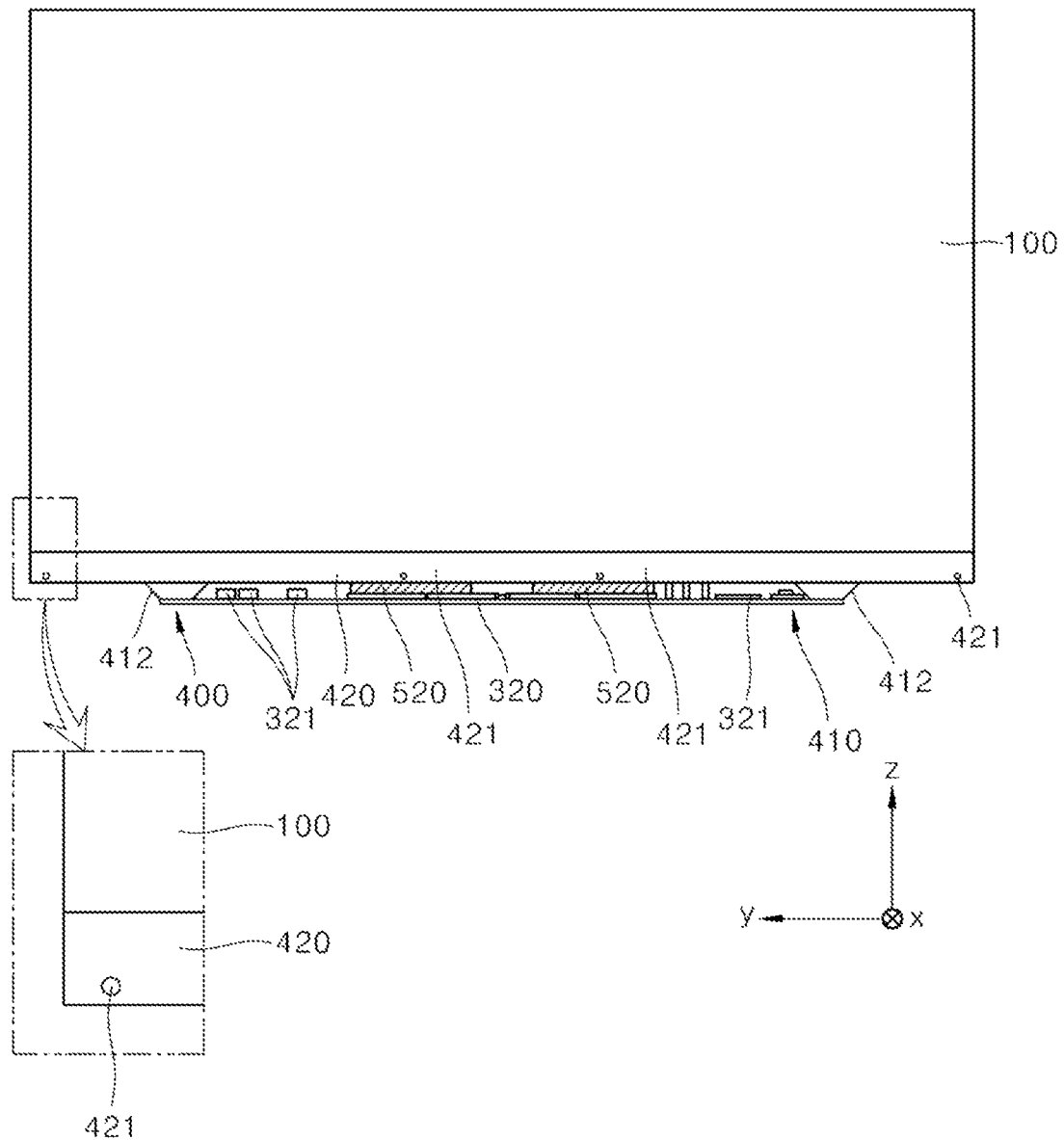
FIG. 3 is a front view showing a display module according to one embodiment.
Figure 4:
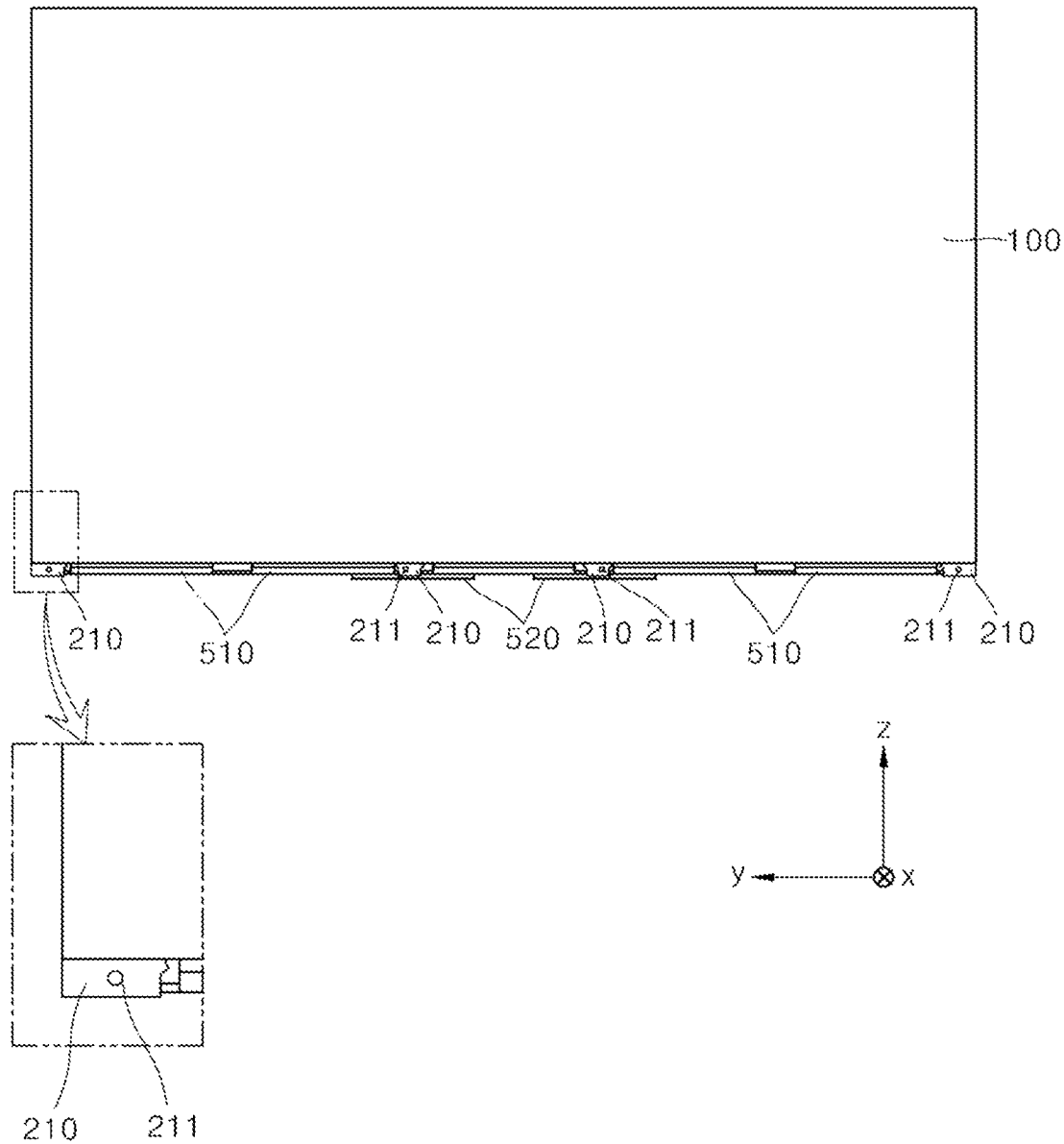
FIG. 4 is a view omitting a bracket and a second board from FIG. 3.
Figure 5:
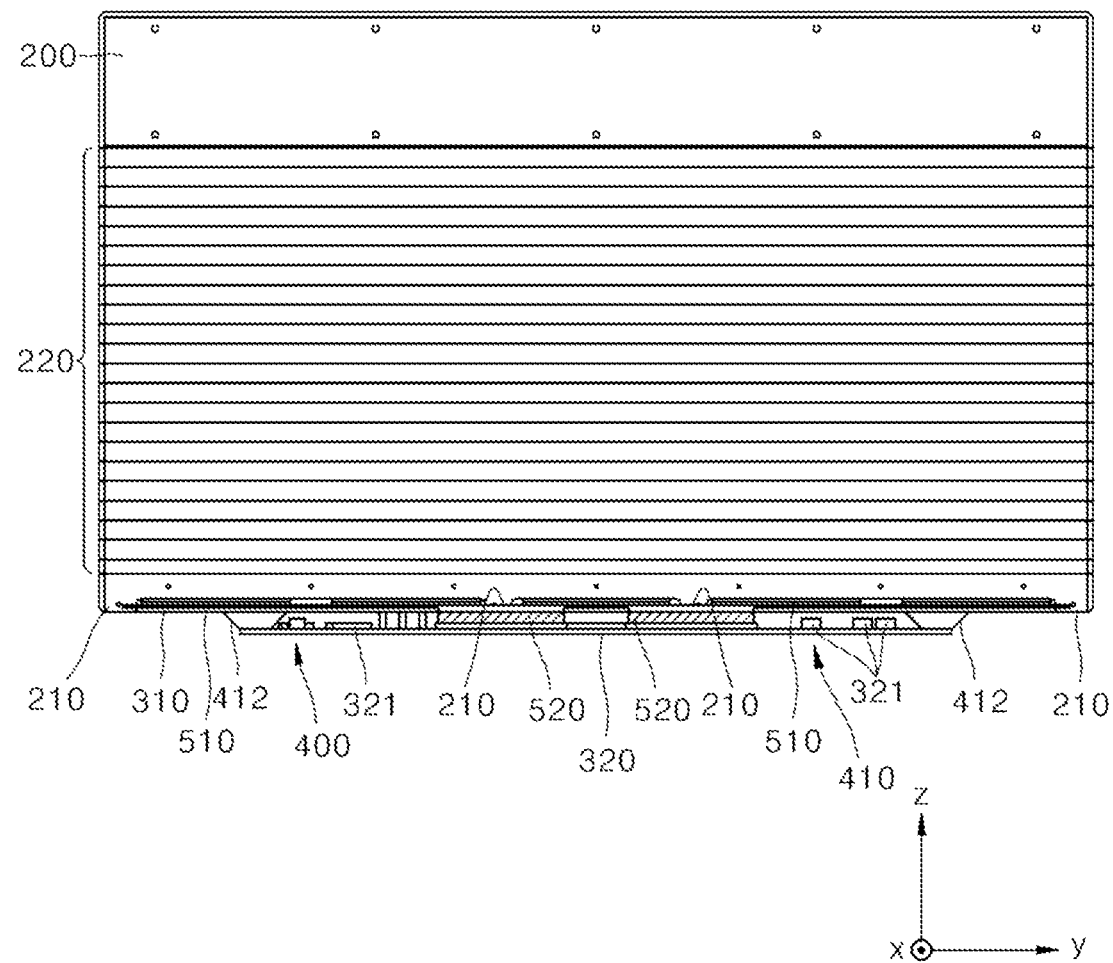
FIG. 5 is a rear view showing a display module according to one embodiment.

FIG. 3 is a front view showing the display module 10 according to one embodiment. FIG. 4 is a view omitting the bracket 400 and the second board 320 from FIG. 3. FIG. 5 is a rear view showing the display module 10 according to one embodiment.

The display module 10 according to an embodiment may further include the bracket 400. The bracket 400 may be coupled to the lower end of the display 100 and the printed circuit board 300 may be mounted on the bracket 400.

The printed circuit board 300 may be mounted on the bracket 400 and the bracket 400 may be coupled to the apron 200 to press the display 100.

As described above, in the display 100, the peeling of each layer may occur by the repetitive and continuous bending.

Further, because the display 100 and the apron 200 are also attached to each other, separation may occur between the display 100 and the apron 200 by the repetitive and continuous bending thereof. Like the peeling of the display 100 itself, the separation between the display 100 and the apron 200 is highly likely to occur at the lower end of the display 100. Such separation may cause the damage or the failure of the display module 10 and the display apparatus including the same.

The bracket 400 may be coupled to the display 100 and press the display 100 to maintain close contact between the display 100 and the apron 200, thereby effectively suppressing the separation between the apron 200 and the display 100.

Further, the bracket 400 may be coupled to the apron 200 and disposed to surround the lower end of the display 100, so that the lower end of the display 100 may be pressed by the bracket 400 from the front and pressed by the apron 200 from the rear.

The lower end of the display 100 may be pressed by the bracket 400 and the apron 200, so that, even when the display 100 is repeatedly bent, the layers constituting the display 100 may maintain close contact therebetween. Accordingly, the occurrence of peeling at the lower end of the display 100 may be effectively suppressed.

Figure 6:
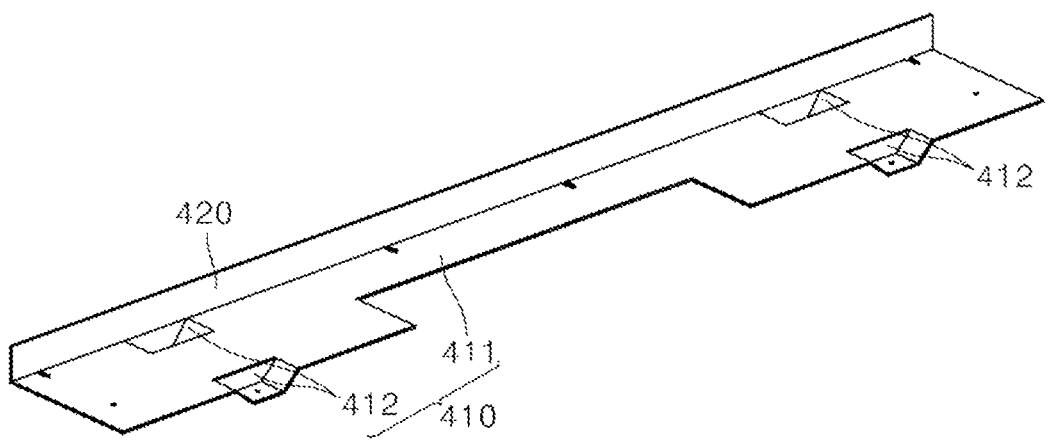
FIG. 6 is a perspective view showing a bracket according to one embodiment.
Figure 7:
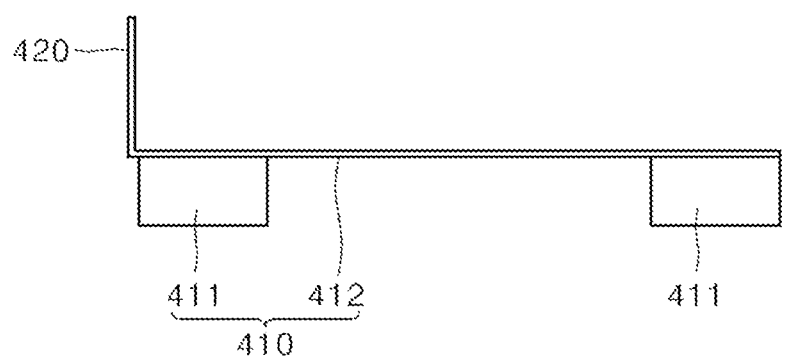
FIG. 7 is a side view of FIG. 6.
Figure 8:
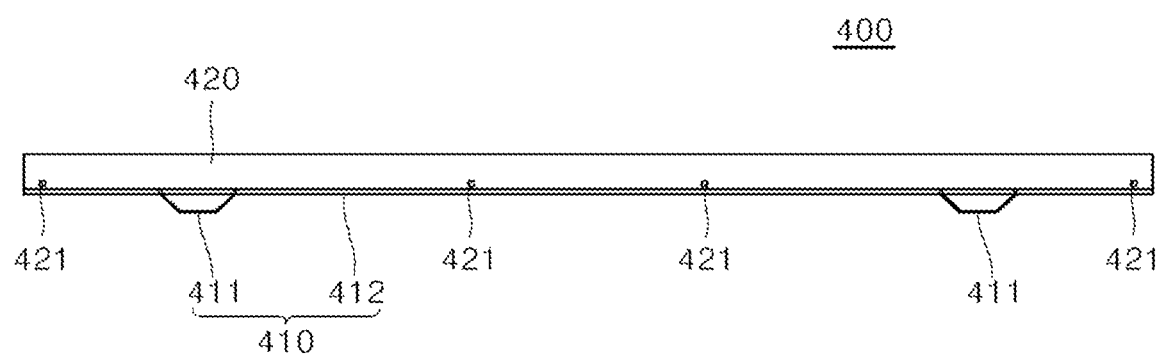
FIG. 8 is a front view of FIG. 6.

Hereinafter, with reference to the drawings, the bracket 400 will be described in more detail. FIG. 6 is a perspective view showing the bracket 400 according to one embodiment. FIG. 7 is a side view of FIG. 6. FIG. 8 is a front view of FIG. 6.

The bracket 400 according to an embodiment shown in FIG. 6 may be made of a metal material, and may be manufactured by rolling a thin plate. However, the present disclosure is not limited thereto.

The bracket 400 may be coupled to a bottom face of the display 100, and may dispose the printed circuit board 300 on the bottom face of the display 100 in a way bent with respect to the display 100. The bracket 400 may allow the first board 310 and the second board 320 to maintain a distance from each other in the first direction.

Because of such structure, the bracket 400 may secure a space for preventing the first board 310 and the second board 320 from being in contact with each other or interfering with each other and for the elements disposed on each board to be mounted. Accordingly, the bracket 400 may stably mount the printed circuit board 300 including the driving circuit to the display module 10.

The bracket 400 may include a base 410 and a pressing coupling portion 420. The base 410 may be disposed on bottom faces of the display 100 and the apron 200 and directed in a direction intersecting the first direction of the display 100 and the apron 200, and the printed circuit board 300 may be mounted on the base 410.

The pressing coupling portion 420 may be bent from a front face of the base 410 in a way parallel to the first direction of the display 100, and may be coupled to the apron 200 and may be in contact with the display 100 to press the display 100.

The pressing coupling portion 420 may be disposed to be in contact with a front face of the display 100 at a lower portion of the display 100, and may press the lower portion of the display 100. In addition, the pressing coupling portion 420 may be disposed such that a length direction thereof is parallel to the second direction of the display 100 to press an entirety of a lower portion of the front face of the display 100.

The apron 200 may include a plurality of first protrusions 210 protruding from the lower end of the display 100. The first protrusion 210 may include a plurality of first protrusions, and the first protrusions 210 may be disposed to be spaced apart from each other along a length direction of the pressing coupling portion 420 of the bracket 400.

The pressing coupling portion 420 may be coupled to the first protrusion 210 to press the display 100. The pressing coupling portion 420 and the first protrusion 210 may be coupled to each other by a fastening mechanism such as a screw bolt.

The first protrusion 210 may have a first fastening hole 211 defined therein into which the coupling mechanism is fastened. The pressing coupling portion 420 may have a second fastening hole 421 defined therein into which the coupling mechanism is fastened at a position corresponding to the first fastening hole 211.

Because the first protrusion 210 protrudes in a downward direction from the lower end of the display 100, without any damage to the display 100, the coupling mechanism is fastened to the first fastening hole 211 and the second fastening hole 421, so that the bracket 400 may be coupled with the apron 200. Because of such structure, a lower portion of the apron 200 and the pressing coupling portion 420 of the bracket 400 may press lower portions of the front and rear faces of the display 100.

Because of such structure, the occurrence of the peeling of the display 100 at the lower end of the display 100 and the separation between the display 100 and the apron 200 may be effectively suppressed.

The base 410 may include a seating plate 411 and a second protrusion 412. The seating plate 411 may be bent from the pressing coupling portion 420 and the first board 310 may be seated on a top face of the seating plate 411. The second protrusion 412 may protrude downwardly of the seating plate 411, and may separate the first board 310 and the second board 320 from each other in the first direction.

The first board 310 and the second board 320 may be spaced apart from each other in the first direction of the display module 10 by the second protrusion 412. In such separation space defined by the second protrusion 412, the elements disposed on the first board 310 or the second board 320 having a predefined volume may be disposed without being in contact with each other.

The first board 310 may be seated on the top face of the seating plate 411, and the second board 320 may be seated on a bottom face of the first protrusion 210. In this regard, the first board 310 and the second board 320 may be coupled to the bracket 400 by the coupling mechanism such as the screw bolt, and may be disposed to be spaced apart from each other in the first direction of the display module 10.

The number of second protrusions 412 may be equal to or greater than 2. The number of second protrusions 412 and a position of each of the second protrusions 412 may be appropriately designed within a range capable of stably maintaining the spaced arrangement of the first board 310 and the second board 320.

In the bracket 400 according to an embodiment shown in FIGS. 6 to 8, the second protrusion 412 may be formed as a top face of the seating plate 411 is recessed and a bottom face of the seating plate 411 protrudes. That is, the second protrusion 412 may be formed by deformation of the seating plate 411.

For example, the bracket 400 may be made of a metal material, and the second protrusion 412 may be formed as the seating plate 411 is deformed by the rolling processing. However, the present disclosure is not limited thereto.

Figure 9:
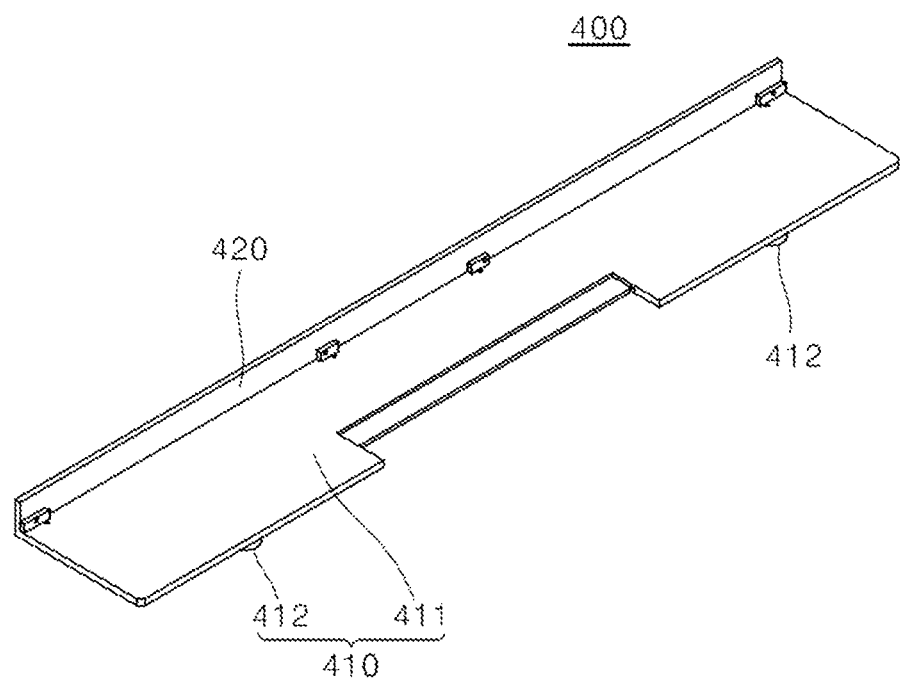
FIG. 9 is a perspective view showing a bracket according to another embodiment.
Figure 10:
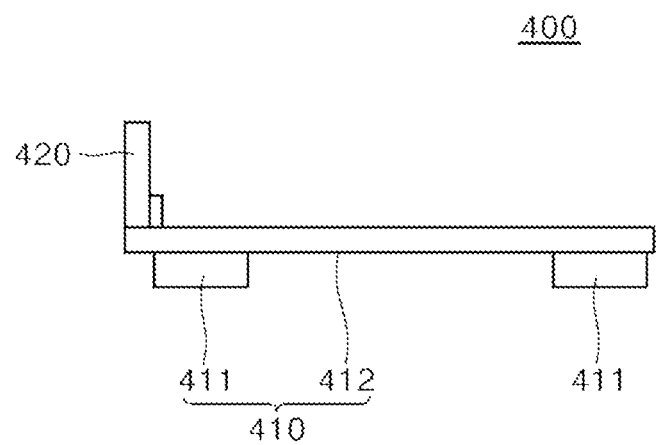
FIG. 10 is a side view of FIG. 9.
Figure 11:
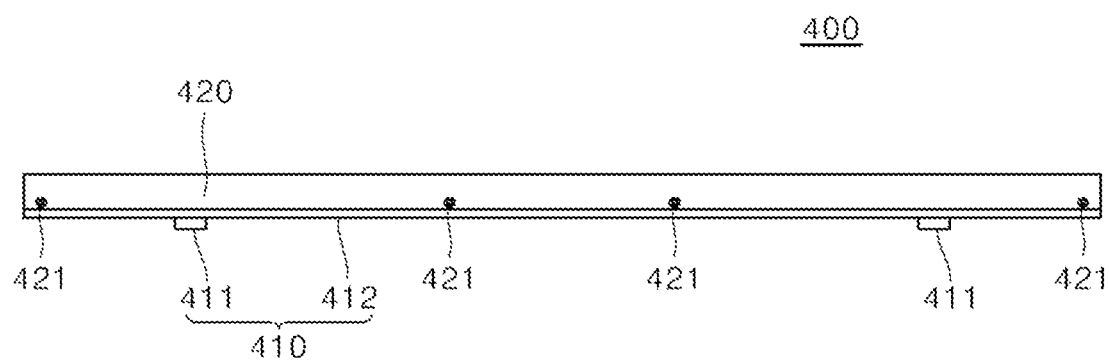
FIG. 11 is a front view of FIG. 9.
Figure 12:
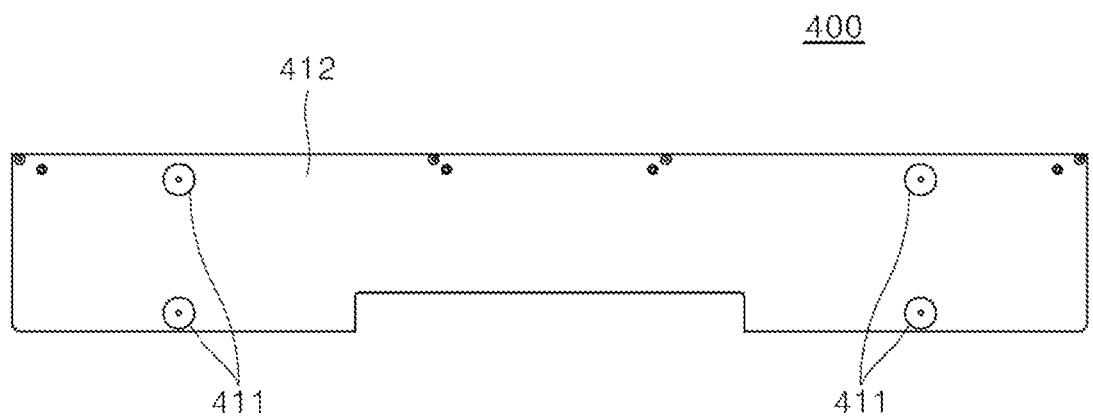
FIG. 12 is a bottom view of FIG. 9.

FIG. 9 is a perspective view showing the bracket 400 according to another embodiment. FIG. 10 is a side view of FIG. 9. FIG. 11 is a front view of FIG. 9. FIG. 12 is a bottom view of FIG. 9. The bracket 400 according to an embodiment shown in FIG. 9 may be made of a plastic material, and may be manufactured by the injection molding. However, the present disclosure is not limited thereto.

In the bracket 400 according to an embodiment shown in FIGS. 9 to 12, the second protrusion 412 may be formed as a protrusion is formed on a bottom face of the seating plate 411.

For example, the bracket 400 may be made of the plastic material and the second protrusion 412 may be formed by the injection molding. Because the structure other than the above is the same as that of the bracket 400 described above, duplicate description is omitted.

Figure 13:
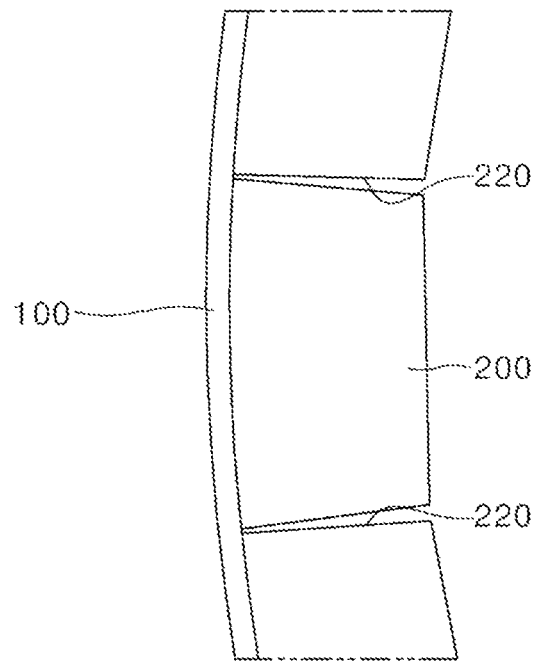
FIG. 13 is a schematic side cross-sectional view for showing an apron according to one embodiment.

FIG. 13 is a schematic side cross-sectional view for showing the apron 200 according to one embodiment. The apron 200 may have a recessed groove 220 defined such that a length direction thereof is directed in the second direction of the display 100. The recessed groove 220 may include a plurality of recessed grooves, and the recessed grooves 220 may be defined at regular spacings in the first direction of the display module 10.

The apron 200 may be made of a flexible material that may be bent. However, the apron 200 may be formed to be relatively thick compared to the display 100 in order to stably support and protect the display 100. Therefore, as the plurality of recessed grooves 220 are defined in the apron 200, the apron 200 may be smoothly bent.

In the apron 200 according to an embodiment shown in FIG. 13, a wall face of the recessed groove 220 may be in a straight shape. When the apron 200 has the recessed groove 220 in the straight shape, compared to a curved recessed groove 220 to be described later, a space defined by the recessed groove 220 is large. Therefore, in the case of the apron 200 having the straight recessed groove 220, there is an advantage that the bending is made smoothly.

Figure 14:
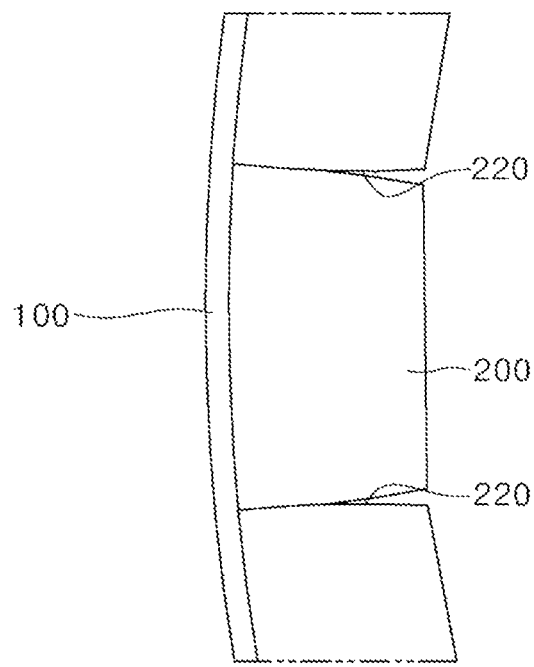
FIG. 14 is a schematic side cross-sectional view for showing an apron according to another embodiment.

FIG. 14 is a schematic side cross-sectional view for showing the apron 200 according to another embodiment.

In the apron 200 according to an embodiment shown in FIG. 14, a cross-section of the wall face of the recessed groove 220 may be formed in a curved shape convex in a direction toward a center of the recessed groove 220. The wall face of the recessed groove 220 may form a gentle curve.

When the apron 200 has the curved recessed groove 220, the space defined by the recessed groove 220 is smaller than that of the aforementioned straight recessed groove 220. Because of such structure, the apron 200 having the curved recessed groove 220 may easily recover linearity again from the bent state.

Therefore, the apron 200 having the curved recessed groove 220 may smoothly deform the display 100 from the bent state to a straight unfolded state in a section where the display 100 is exposed to the outside.

Because the straight recessed groove 220 and the curved recessed groove 220 have the above-described characteristics, the shape of the recessed groove 220 of the apron 200 may be appropriately selected in consideration of operating characteristics required for the display module 10.

Figure 15:
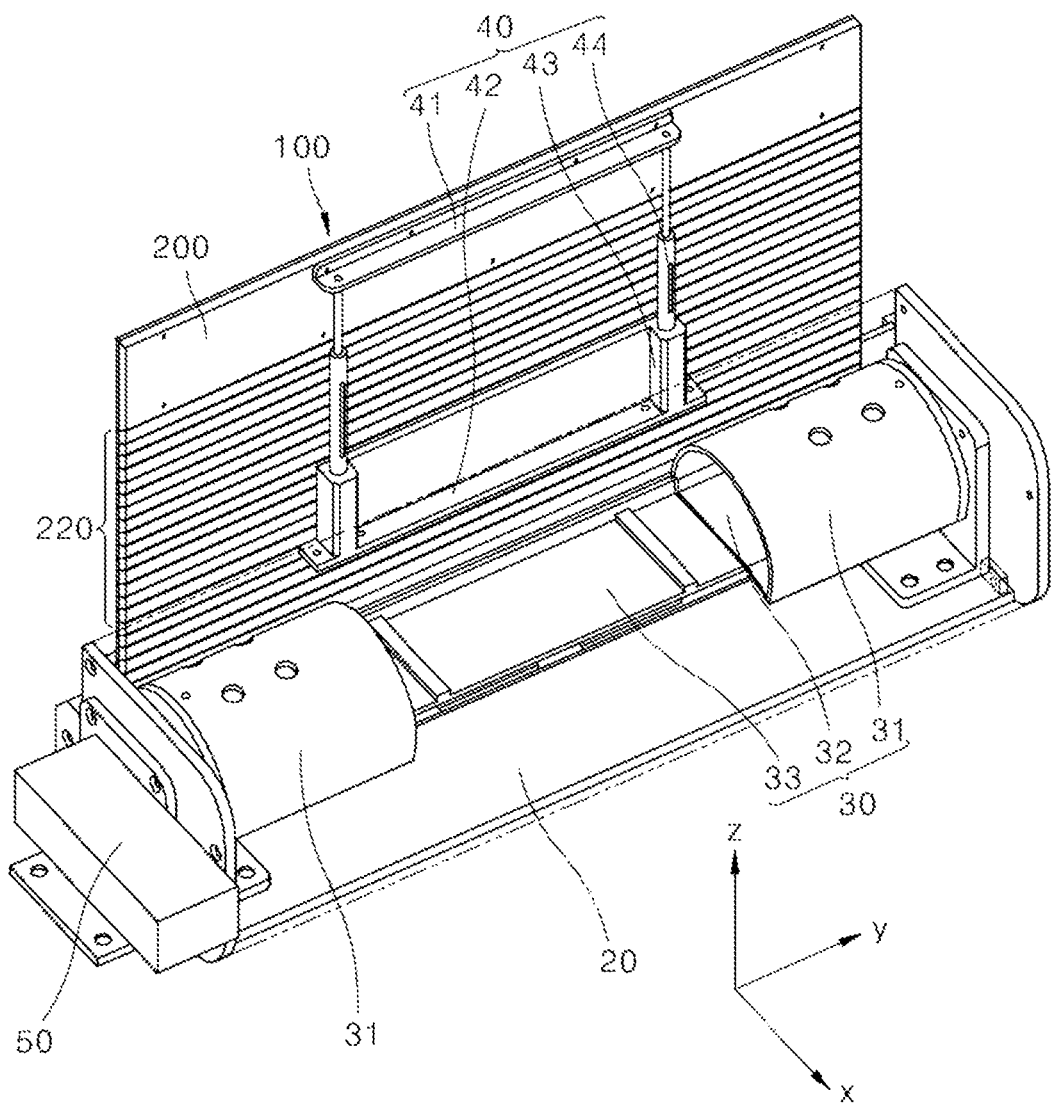
FIG. 15 is a perspective view showing a display apparatus according to one embodiment.
Figure 16:
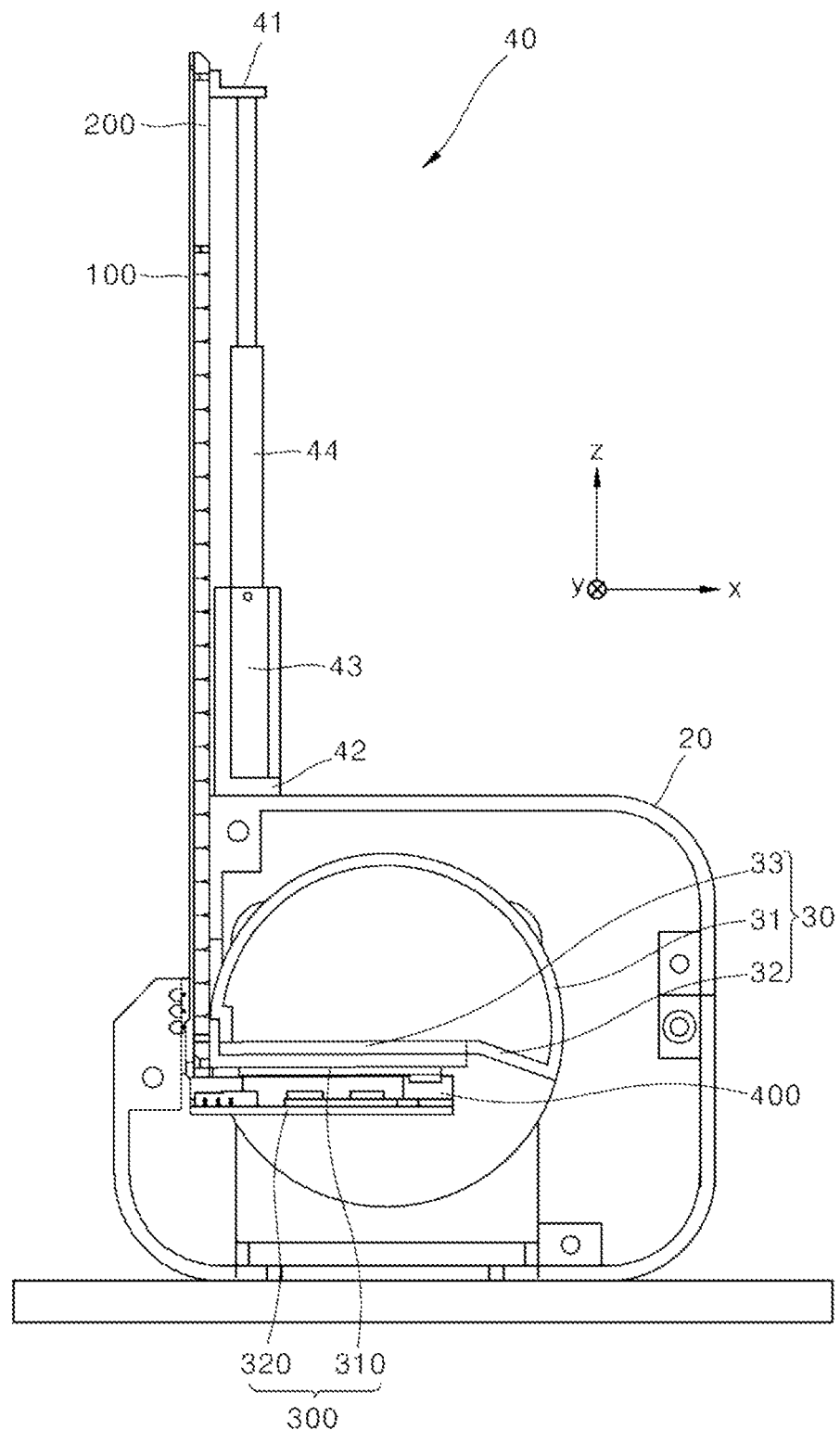
FIG. 16 is a side cross-sectional view of FIG. 15.
Figure 17:
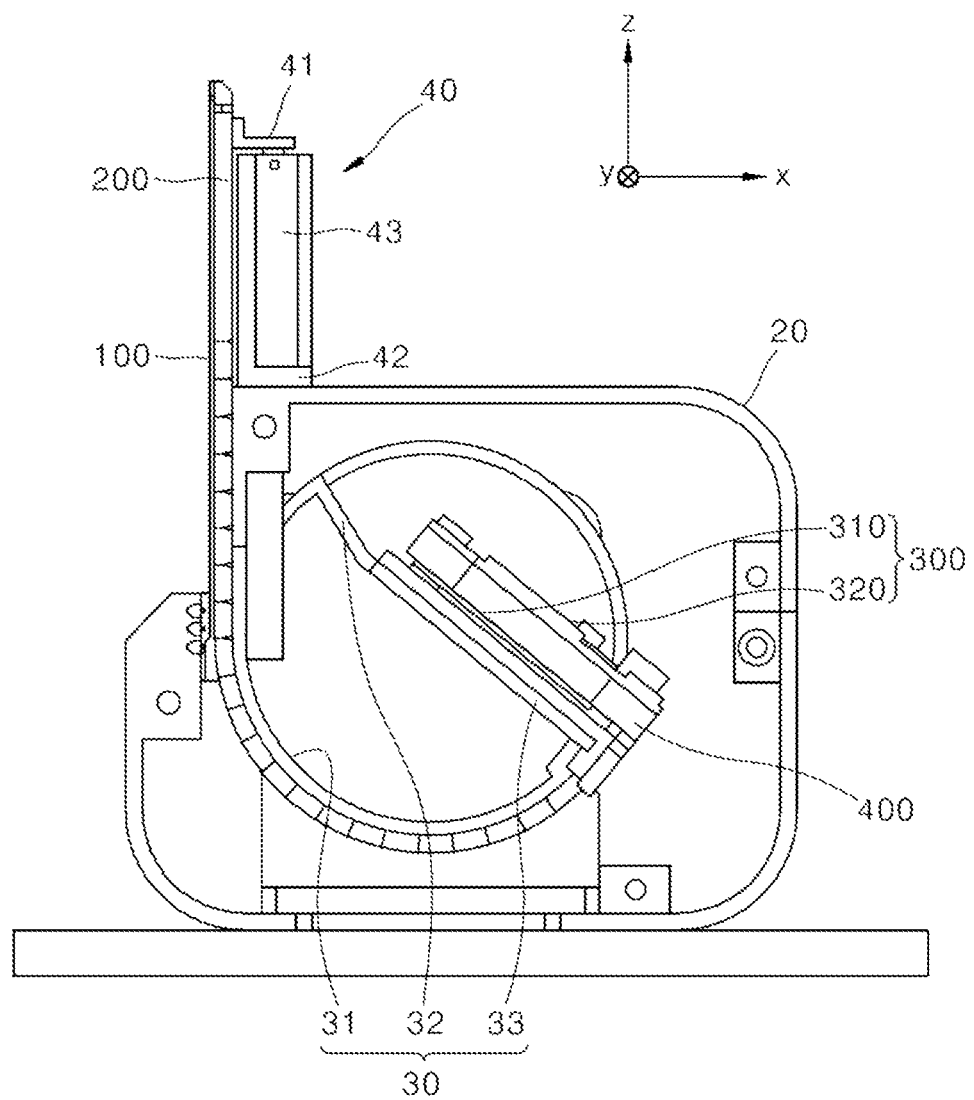
FIG. 17 is a view showing a state in which a portion of each of a display and an apron is accommodated in a housing in FIG. 16.

FIG. 15 is a perspective view showing a display apparatus according to one embodiment. FIG. 16 is a side cross-sectional view of FIG. 15. FIG. 17 is a view showing a state in which a portion of each of the display 100 and the apron 200 is accommodated in the housing 20 in FIG. 16.

The display apparatus according to an embodiment may include a display module 10, a housing 20, a rolling guide 30, a guide 40, and a motor 50. The display module 10 is the same as described above.

The housing 20 may accommodate therein at least a portion of the display module 10. For example, the housing 20 may be embedded in the dashboard of the vehicle. In this regard, each of the display 100 and the apron 200 may be disposed such that at least a portion thereof is exposed to the outside of the dashboard. In one example, an area of each of the display 100 and the apron 200 accommodated in the housing 20 may vary.

Referring to FIGS. 15 and 16, when the display 100 and the apron 200 ascend, portions thereof accommodated inside the housing 20 in the bent state may be unfolded again to be exposed to the outside of the housing 20, and the user may view the image or the video reproduced on the unfolded portion of the display 100.

Referring to FIG. 17, when the display 100 and the apron 200 descend, at least a portion of each of the display 100 and the apron 200 may be bent and deformed into the curved shape when viewed from the side and accommodated in the housing 20.

The rolling guide 30 may be accommodated in the housing 20 and may rotate with respect to the housing 20. The rolling guide 30 may be disposed such that the display module 10 is mounted thereon and at least the portion of each of the display 100 and the apron 200 is wound therearound.

The guide 40 may have one end mounted on the apron 200 and the other end mounted on the housing 20. The guide 40 may change an externally exposed area of each of the display 100 and the apron 200 by moving each of the display 100 and the apron 200 in the first direction.

The guide 40 may include a first bracket 41, a second bracket 42, a third bracket 43, a moving portion 44, and a reinforcing plate 45. The first bracket 41 may be coupled to the apron 200 and move together with the apron 200. The first bracket 41 may have a bar shape, may be disposed such that a length direction thereof is parallel to the second direction of the apron 200, and may be coupled to an upper portion of the rear face of the apron 200.

The first bracket 41 may be constructed to ascend and descend in the display apparatus. As the first bracket 41 ascends and descends, the apron 200 and the display 100 coupled thereto also ascend and descend, so that the externally exposed areas thereof may be changed.

The second bracket 42 may be coupled to a top face of the housing 20. The second bracket 42 may have a bar shape, may be disposed such that a length direction thereof is parallel to the second direction of the apron 200, and may be coupled to the top face of the housing 20. The housing 20 may support the second bracket 42.

The third bracket 43 may be formed to protrude in an upward direction from the second bracket 42. The third bracket 43 may include a pair of third brackets, and the third brackets 43 may be disposed to be spaced apart from each other at a predetermined distance in the second direction of the apron 200. The third bracket 43 may have a hollow defined therein for the moving portion 44 to be mounted.

The reinforcing plate 45 may be disposed between the pair of third brackets 43 disposed to be spaced apart from each other and may be coupled to the pair of third brackets 43 to maintain the designed spacing distance between the pair of third brackets 43. The reinforcing plate 45 may be formed in a plate shape and may be manufactured integrally with the pair of third brackets 43. However, the reinforcing plate 45 is not an essential component of the display apparatus.

In one example, the second bracket 42, the third bracket 43, and the reinforcing plate 45 may be integrally manufactured, but the present disclosure may not be limited thereto.

The moving portion 44 may have one end coupled to the first bracket 41 and may be inserted into the third bracket 43 to be movable in the first direction with respect to the third bracket 43. The moving portion 44 may be inserted into the hollow of the third bracket 43 to ascend and descend with respect to the third bracket 43.

Therefore, as the moving portion 44 ascends and descends, the first bracket 41 and the apron 200 coupled thereto and the display 100 coupled to the apron 200 may ascend and descend, and accordingly, the externally exposed areas of the apron 200 and the display 100 may be changed.

The moving portion 44 may support the display 100 and the apron 200 such that the exposed portions of the display 100 and the apron 200 maintain the linearity while ascending and descending.

The motor 50 may be disposed to lift and lower the display 100 and the apron 200. Further, the moving portion 44 may ascend and descend by operation of the motor 50. The motor 50 may be coupled to the housing 20, and a rotation shaft thereof may be coupled to the rolling guide 30.

When the motor 50 rotates, the rolling guide 30 may rotate, and accordingly the display 100 and the apron 200 may be wound around or unwound from the rolling guide 30.

Referring to FIG. 16, when the motor 50 rotates in a direction in which the display 100 and the apron 200 are unwound from the rolling guide 30, upper ends of the display 100 and the apron 200 may ascend to increase the externally exposed areas thereof. In this regard, the moving portion 44 coupled to the apron 200 may ascend.

Referring to FIG. 17, when the motor 50 rotates in an opposite direction in which the display 100 and the apron 200 are wound around the rolling guide 30, the upper ends of the display 100 and the apron 200 may descend to reduce the externally exposed areas thereof. In this regard, the moving portion 44 coupled to the apron 200 may descend.

Hereinafter, the rolling guide 30 will be described in more detail. The rolling guide 30 may include a curved portion 31, a bridge 32 and a rib 33. The display 100 and the apron 200 may be wound around an outer circumferential face of the curved portion 31. The curved portion 31 may be formed in, for example, a circular arc shape.

The curved portion 31 may include a pair or curved portions, and the pair or curved portions may be spaced apart from each other in the second direction of the display 100. In this regard, the rib 33 may be disposed between the pair of curved portions 31.

As the motor 50 operates and the rolling guide 30 rotates, an area in which each of the display 100 and the apron 200 is wound around the curved portion 31 may be variable. As shown in FIG. 16, when the upper ends of the display 100 and the apron 200 reach a designed highest vertical level and the display 100 is fully unfolded, the portions of the display 100 and the apron 200 wound around the curved portion 31 may not exist or may be very small.

Conversely, as shown in FIG. 17, when the rolling guide 30 rotates and the upper ends of the display 100 and the apron 200 reach a designed lowest vertical level, the areas in which the display 100 and the apron 200 are wound around the curved portion 31 may be the maximum.

The bridge 32 may connect both ends of the curved portion 31 to each other. Like the curved portions 31, the bridge 32 may include a pair of bridges. The curved portion 31 and the bridge 32 may be integrally formed, but the present disclosure may not be limited thereto. The bridge 32 may be approximately formed in a plate shape, and both ends of the rib 33 may be respectively coupled to the pair of bridges 32.

The rib 33 may be coupled to the bridge 32, the printed circuit board 300 and the bracket 400 may be mounted on the rib 33, and the rib 33 may be coupled to a lower portion of the apron 200. The rib 33 may be approximately formed in a plate shape.

The seating plate 411 of the bracket 400 may be coupled to one face of the rib 33, for example, via the coupling mechanism such as the screw bolt. The first board 310, the second board 320, and the seating plate 411 of the bracket 400 on which the boards are seated according to an embodiment may be disposed such that length directions thereof are directed in a direction parallel to the second direction of the display 100.

Accordingly, the rib 33 may be formed such that a length direction thereof is parallel to the second direction of the display 100 to correspond to the shape of the seating plate 411 of the bracket 400. Because of such structure, the rolling guide 30 may provide a sufficient space in which the first board 310 and the second board 320 may be disposed.

The bracket 400 on which the first board 310 and the second board 320 are mounted may be coupled to the rib 33. As the first board 310 and the second board 320 are coupled to the bracket 400 and mounted on the rib 33, the first board 310 and the second board 320 may rotate together with the rotation of the rolling guide 30.

The display apparatus according to an embodiment of the present disclosure may be described as follows.

A display apparatus may include a display constructed such that at least a portion thereof is deformable, an apron constructed such that at least a portion thereof is deformable, wherein the apron is coupled to the display, a printed circuit board electrically connected to the display, and a bracket having the printed circuit board mounted thereon, wherein the bracket is coupled to the apron to press the display.

The display may be formed in a plate shape, and the display may include a cover glass and a panel attached to one face of the cover glass and reproducing an image or a video.

The bracket may be coupled to a bottom face of the display, and may dispose the printed circuit board on the bottom face of the display in a way bent with respect to the display.

The bracket may include a base disposed on the bottom face of the display and a bottom face of the apron, and directed in a direction intersecting a first direction of the display and the apron, wherein the printed circuit board is mounted on the base, and a pressing coupling portion bent from a front face of the base in a way parallel to the first direction of the display, wherein the pressing coupling portion is coupled to the apron and is in contact with the display to press the display.

The apron may include a plurality of first protrusions protruding from a lower end of the display, and the pressing coupling portion may be coupled to the first protrusions to press the display.

The first protrusion may have a first fastening hole defined therein and fastened with a coupling mechanism, and the pressing coupling portion may have a second fastening hole defined therein at a position corresponding to the first fastening hole and fastened with the coupling mechanism.

The printed circuit board may include a first board electrically connected to the display, and a second board electrically connected to the first board and disposed at a position spaced apart from the first board.

The printed circuit board may include a first connector for electrically connecting the display and the first board to each other and constructed to be bent, and a second connector for electrically connecting the first board and the second board to each other and constructed to be bent.

The base may include a seating plate bent from the pressing coupling portion, wherein the first board is seated on a top face of the seating plate, and a second protrusion protruding downwardly of the seating plate, and separating the first board and the second board from each other in the first direction.

The second protrusion may be formed as the top face of the seating plate is recessed and a bottom face of the seating plate protrudes.

The second protrusion may be formed as a protrusion is formed on a bottom face of the seating plate.

The apron may have a recessed groove defined therein whose length direction is directed in a second direction of the display, and a cross-section of a wall face of the recessed groove may be formed in a straight shape.

The apron may have a recessed groove defined therein whose length direction is directed in a second direction of the display, and a cross-section of a wall face of the recessed groove may be formed in a curved shape convex in a direction toward a center of the recessed groove.

A display apparatus includes a display module including a display constructed such that at least a portion thereof is deformable, an apron constructed such that at least a portion thereof is deformable, wherein the apron is coupled to the display, a printed circuit board electrically connected to the display, and a bracket having the printed circuit board mounted thereon, wherein the bracket is coupled to the apron to press the display, wherein the display apparatus further includes a housing for accommodating at least a portion of the display module, a rolling guide accommodated in the housing and constructed to rotate with respect to the housing, wherein the display module is mounted on the rolling guide, wherein at least a portion of each of the display and the apron is wound around the rolling guide, and a guide having one end mounted on the apron and the other end mounted on the housing, wherein the guide changes externally exposed areas of the display and the apron by moving the display and the apron in a first direction.

The rolling guide may include a curved portion, wherein the display and the apron are wound around an outer circumferential face of the curved portion, a bridge for connecting both ends of the curved portion to each other, and a rib coupled to the bridge, wherein the printed circuit board and the bracket are mounted on the rib, wherein the rib is coupled to a lower portion of the apron.

The present disclosure as described above is not limited to the above-described embodiments and the accompanying drawings. It will be apparent to those of ordinary skill in the technical field to which the present disclosure belongs that various substitutions, modifications and changes may be made within the scope not departing from the technical ideas of the present disclosure. Therefore, all changes or modifications derived from the meaning and scope of the embodiments described herein and their equivalent concepts should be construed as being included in the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display apparatus, comprising:
a display with at least a portion of the display being deformable;
an apron with at least a portion of the apron being deformable, wherein the apron is coupled to the display;
a printed circuit board electrically connected to the display; and
a bracket having the printed circuit board mounted on the bracket, wherein the bracket is coupled to the apron and configured to press the display, wherein the bracket includes:
a base disposed on the bottom face of the display and on a bottom face of the apron, the base extending in a direction intersecting a first direction of the display and the apron, wherein the printed circuit board is mounted on the base; and
a coupling portion bent from a front face of the base in a second direction parallel to the first direction of the display, wherein the coupling portion is coupled to the apron and is in contact with the display, the coupling portion configured to press the display,
wherein the apron includes a plurality of protrusions extending from a lower end of the display, and
wherein the coupling portion is coupled to the plurality of protrusions and configured to press the display.

2. The display apparatus of claim 1, wherein the display is a plate shape, and wherein the display further includes:
a cover glass; and
a panel attached to one face of the cover glass and reproducing an image or a video.

3. The display apparatus of claim 1, wherein the bracket is coupled to a bottom face of the display, and the printed circuit board is disposed on the bottom face of the display and bent with respect to the display via the bracket.

4. The display apparatus of claim 1, wherein at least one of the plurality of protrusions has a first fastening hole,
wherein the coupling portion has a second fastening hole at a position corresponding to the first fastening hole, and
wherein the display apparatus further comprises a fastener inserted through the first fastening hole and the second fastening hole.

5. The display apparatus of claim 1, wherein the printed circuit board includes:
a first board electrically connected to the display; and
a second board electrically connected to the first board, the second board disposed at a position spaced apart from the first board.

6. The display apparatus of claim 5, wherein the printed circuit board includes:
a first connector electrically connecting the display and the first board to each other, the first connector being bendable; and
a second connector electrically connecting the first board and the second board to each other, the second connector being bendable.

7. The display apparatus of claim 6, wherein the base of the bracket includes:
a seating plate bent from the coupling portion, wherein the first board is seated on a top face of the seating plate; and
a protrusion extending downwardly from the seating plate, the protrusion separating the first board and the second board from each other in the first direction.

8. The display apparatus of claim 7, wherein the top face of the seating plate includes a recess that defines the protrusion with the protrusion extending from a bottom face of the seating plate.

9. The display apparatus of claim 7, wherein the protrusion extends from a bottom face of the seating plate.

10. The display apparatus of claim 1, wherein the apron has a recessed groove with a length in a direction of the display,
wherein a cross-section of a wall face of the recessed groove is a straight shape.

11. The display apparatus of claim 1, wherein the apron has a recessed groove with a length in a direction of the display,
wherein a cross-section of a wall face of the recessed groove is a curved shape that is convex in a direction toward a center of the recessed groove.

12. The display apparatus of claim 1, wherein the bracket is configured to press a front of a lower end of the display and the apron is configured to press a rear of the lower end of the display.

13. A display apparatus, comprising:
a display module including:
a display with at least a portion of the display being deformable;
an apron with at least a portion of the apron being deformable, wherein the apron is coupled to the display;
a printed circuit board electrically connected to the display; and
a bracket having the printed circuit board mounted on the bracket, wherein the bracket is coupled to the apron and applies a pressing force on the display;
a housing that accommodates at least a portion of the display module;
a rolling guide accommodated in the housing and configured to be rotatable with respect to the housing, wherein the display module is mounted on the rolling guide, and wherein the at least the portion of each of the display and the apron that is deformable is capable of winding around the rolling guide; and a guide having a first end mounted on the apron and a second end mounted on the housing, wherein the guide is configured to change areas of the display and the apron that are exposed outside of the housing by moving the display and the apron in a first direction, wherein the rolling guide includes:
- a curved portion, the display and the apron capable of winding around an outer circumferential face of the curved portion;
- a bridge for connecting both ends of the curved portion to each other; and
- a rib coupled to the bridge, wherein the printed circuit board and the bracket are mounted on the rib, wherein the rib is coupled to a lower portion of the apron.

* * * * *